United States Patent [19]

Wakabayashi et al.

[11] Patent Number: 4,748,824
[45] Date of Patent: Jun. 7, 1988

[54] REFRIGERATION APPARATUS FOR TRANSPORT CONTAINER

[75] Inventors: Nobutoshi Wakabayashi, Osaka; Masayuki Aono, Sakai; Katsuyuki Sawai, Minamikawachi; Yasuhiro Oyamada; Katsuhiro Sakoh, both of Kitakyushu; Tsugio Matsuno, Nakama; Tooru Maeda, Hiroshima, all of Japan

[73] Assignees: Daikin Industries, Ltd., Osaka; Electric Mfg. Co., Ltd. Yaskawa, Fukuoka; Mazda Motor Corporation, Hiroshima, all of Japan

[21] Appl. No.: 920,223

[22] Filed: Oct. 17, 1986

[30] Foreign Application Priority Data

Oct. 17, 1985 [JP] Japan .................. 60-233050

[51] Int. Cl.$^4$ .................................... B60H 1/32
[52] U.S. Cl. .................................... 62/239; 62/298; 62/373.1; 290/1 A
[58] Field of Search .................. 62/239, 298, 323.1; 290/1 A, 1 B

[56] References Cited

U.S. PATENT DOCUMENTS

| 1,343,485 | 6/1920 | Shamberg | 290/1 A |
|---|---|---|---|
| 1,380,123 | 5/1921 | Sullivan | 290/1 A |
| 1,638,146 | 8/1927 | Buchenberg | 290/1 B |
| 2,263,476 | 11/1941 | Sunday | 62/323.1 X |
| 2,694,553 | 11/1954 | Hicke et al. | 257/3 |
| 2,735,277 | 2/1956 | Clark | 62/323.1 |
| 2,881,600 | 4/1959 | Elfring | 62/239 |
| 2,891,389 | 6/1959 | Tull | 62/298 |
| 2,932,957 | 4/1960 | Norman | 62/323.1 X |
| 3,692,100 | 9/1972 | Gallagher, Jr. | 62/323.1 X |
| 3,712,078 | 1/1973 | Maymard et al. | 62/298 X |
| 4,257,240 | 3/1981 | Christiansen et al. | 62/239 X |
| 4,551,986 | 11/1985 | Anderson et al. | 62/239 |

FOREIGN PATENT DOCUMENTS 2919237 11/1980 Fed. Rep. of Germany ..... 62/323.1

Primary Examiner—William E. Tapolcai
Attorney, Agent, or Firm—Birch, Stewart, Kolasch & Birch

[57] ABSTRACT

A refrigeration apparatus for a transport container has a partition to divide the interior of a box, which is mounted on the front wall of a container, into two compartments. In one of the compartments is disposed a refrigeration assembly including an evaporator, an evaporator fan, a condenser, a condenser fan and a refrigerant compressor, on the other hand, in the other one of the compartments is disposed a common mount on which a generator assembly including an engine, an engine radiator, a radiator fan and a generator in in-line relation is mounted in such a manner that the generator assembly may be installed into or removed from the box as one unit. The refrigeration assembly and the generator assembly are thermally isolated from each other by the partition, so that an exhausted warm air from one assembly does not heat the other assembly.

21 Claims, 14 Drawing Sheets

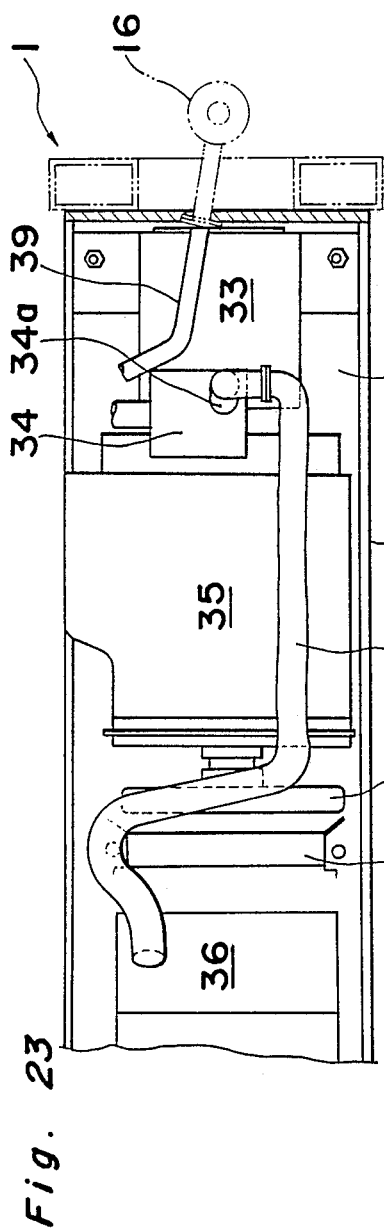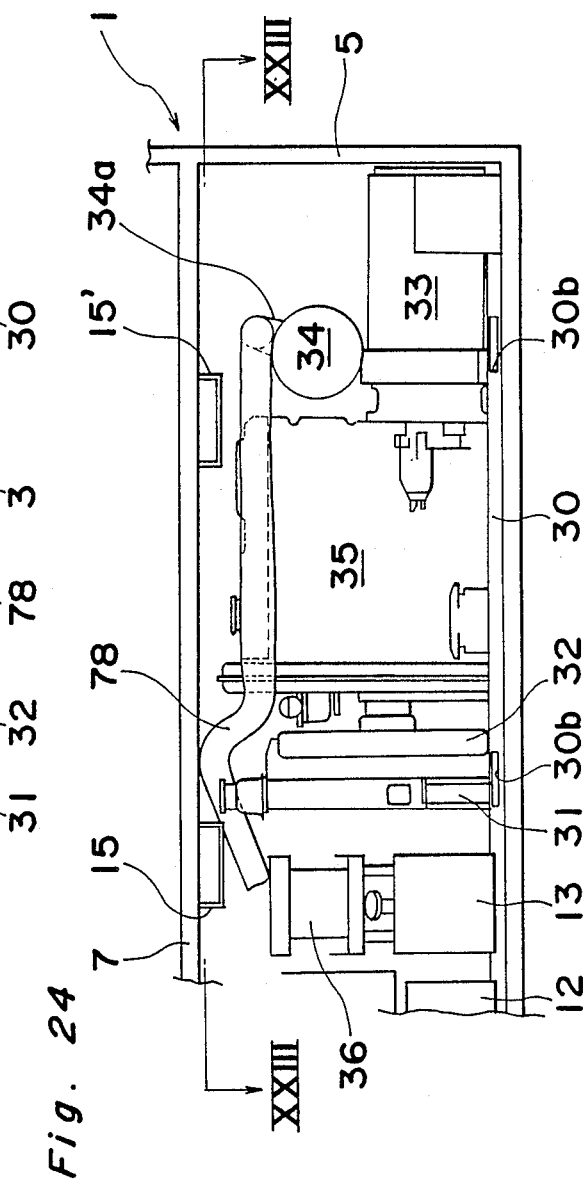
Fig. 23
Fig. 24

REFRIGERATION APPARATUS FOR TRANSPORT CONTAINER

BACKGROUND OF THE INVENTION

The present invention relates to a refrigeration apparatus mounted on the front wall of a transport container to refrigerate the interior of a transport container transported by truck, train or marine vessel.

A conventional refrigeration apparatus for a transport container is shown in FIG. 31 (Japanese Utility Model Laid Open Publication No. 66779/1981). The refrigeration apparatus 100 comprises a box 101 which is mounted on a front wall of a transport container (not shown). A horizontal partition 102 divides the box 101 into upper and lower compartments 150, 151. When observed from a side wall 105 which has an exhaust outlet opening 104, the lower chamber 103 sequentially disposes an internal combustion engine 106, an electric motor-alternator 107, a refrigerant compressor 108 in a line. Additionally, a vertical partition 109 divides the above-mentioned upper compartment 150 into chambers 110 and 113. Upper and lower ends of the chambber 110 are connected to the interior of a transport container located in the rear of the apparatus. The chamber 110 is provided, when viewed from above, with an evaporator fan 111 and an evaporator 112. The other chamber 113 connects, at the lower end thereof, with the lower chamber 103, and is sequentially provided, when viewed from above, with a condenser fan 114, a condenser 115 and an engine radiator 116.

The evaporator 112 and condenser 115 are connected to the refrigerant compressor 108 through a pipe (not shown). The internal combustion engine 106 is connected to a radiator 116 through a coolant water pipe (not shown). The refrigerant compressor 108, the evaporator fan 111 and the condenser fan 114 are adapted to be driven by electricity from an electric motor-alternator 107 which is energized by the internal combustion engine 106, or they may be driven by externally provided commercial power source. Additionally, air within the transport container is, while part of the air is replaced with outside air through an unshown ventilation plate on a front panel of the apparatus, circulated by the evaporator fan 111 and cooled by the evaporator 112. On the other hand, an air introduced from the atmosphere by the condenser fan 114 through an unshown air inlet on the front panel cools the condenser 115 as well as the engine radiator 116 and the air warmed thereby is exhausted to the outlet opening 104 through the lower compartment 103.

In the meanwhile, the most important requirements for such a refrigeration apparatus for a transport container are that the weight of a refrigeration apparatus is reduced as much as possible, if externally provided commerciall power source is available, so as to maximize the loading capacity of cargo or other goods contained in a container, and that an electric generator and an internal combustion engine for driving an electric generator have high energy efficiencies.

However, with the conventional refrigeration apparatus 100 having the above-mentioned construction, it is almost impossible to remove the internal combustion engine 106 and electric motor-alternator 107 even if a commercial power supply is available, rendering an increase in maximum loading capacity impossible. This is because the internal combustion engine 106 and the engine radiator 116 are separately disposed in the lower and upper chambers 103 and 113 and are connected by a coolant water pipe, and consequently, the coolant water pipe must be removed prior to removing the engine 106. Furthermore, the radiator 116 is located in the downstream side of an air flow which is subject to radiation heat from the condenser 115, the downstream side is communicated with the lower chamber 103, and as a result, the radiator fails to have satisfactory cooling efficiency, and additionally, the internal combustion engine 106 within the lower chamber 103 receives a heated exhaust air, causing the output of the engine to drop, and the generation efficiency of the electric motor-alternator deteriorates due to a temperature rise in a coil. Namely, the energy efficiency in the entire electricity generating system disadvantageously deteriorates.

SUMMARY OF THE INVENTION

Therefore, an object of the present invention is to provide a refrigeration apparatus with an electrical system which may be readily removed for weight reduction in instances where a commercial power supply is available, or for inspection or repair work, by incorporating a generator assembly including an internal combustion engine, an electricity generator and other components as one unit, and by completely separating the generator assembly from a refrigeration assembly, and by improving a cooling method with outside air, so as to further improve output and energy efficiency of an internal combustion engine as well as an electricity generator.

In order to achieve the above object, a refrigeration apparatus for a transport container according to the present invention comprises:

a box mounted on a front wall of the transport container having air inlet openings and air outlet openings;

a partition for dividing the interior of the box into two compartments;

a refrigeration assembly for air-conditioning the interior of the transport container disposed in one of the compartments and including an evaporator, an evaporator fan, a condenser, a condenser fan and a refrigerant compressor;

a common mount disposed in the other one of the compartments;

a generator assembly provided on the common mount and including an internal combustion engine cooled by air flowing from the air inlet openings to the air outlet openings, an engine radiator, a radiator fan and a generator;

the engine, the engine radiator, the radiator fan and the generator being linearly arranged on the common mount;

whereby the refrigeration assembly and the generator assembly are thermally isolated from each other by the partition, and the generator assembly can be installed into and removed from the box as one unit.

When a commercial power supply instead of the internally mounted power package is used while a container is transported, the internally mounted power package is easily removed. The engine, the engine radiator and the coolant water pipe which connects them are mounted on the common mount and are simply connected to the refrigerant compressor and the condenser fan provided in the other compartment with wires. The above-mentioned common mount may be easily removed from the other compartment within the box, enabling weight reduction of the refrigeration apparatus. Additionally, because the electricity generator assembly is mounted on the above-mentioned common mount as a single unit, the generator assembly may be readily removed from the box in order to make a trial operation for inspection or repair work. Further, as the condenser in the refrigeration assembly and the engine radiator are independently disposed in the separate compartments, and, as the cooling air passages for them are independent of each other, hot air exhausted from one system never flows into a cooling passage of the other system. Consequently, such a refrigeration apparatus is free from temperature rise from intake air of the engine or temperature rise in a coil of the generator, yielding the an improved energy efficiency and an improved refrigeration efficiency.

A BRIEF DESCRIPTION OF DRAWINGS

The present invention will become more fully understood from the detailed description given hereinbelow and the accompanying drawings which are given by way of illustration only, and thus are not limitative of the present invention, and wherein.

Figure 4:
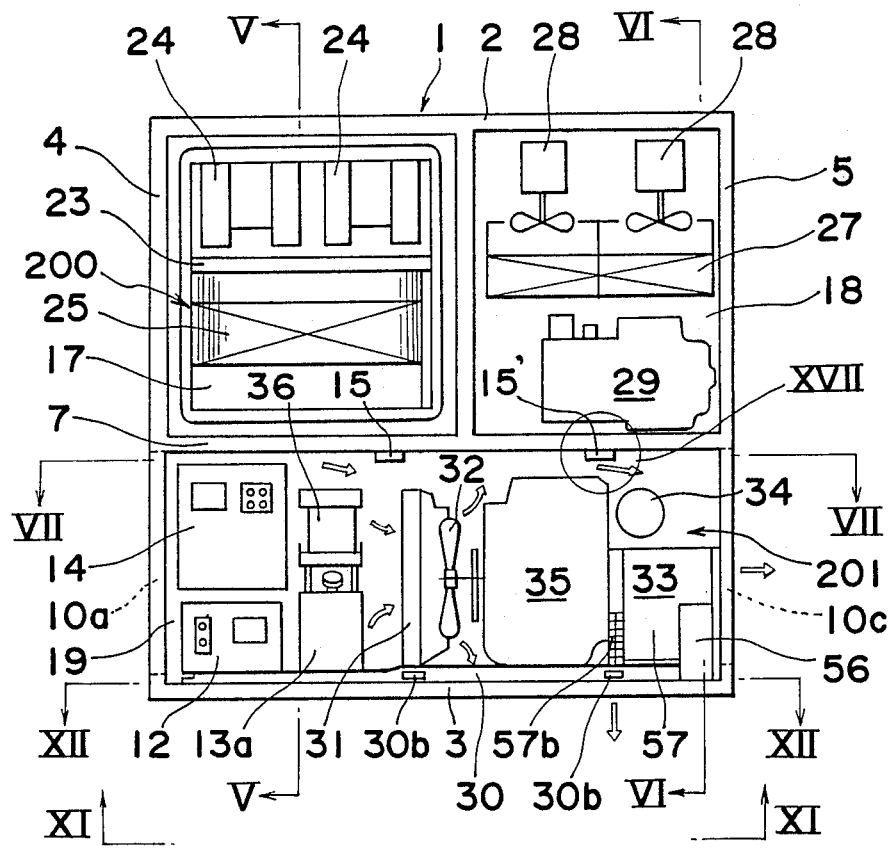
FIG. 4 is a front elevation view of the refrigeration apparatus with front panels removed.
Figure 9:
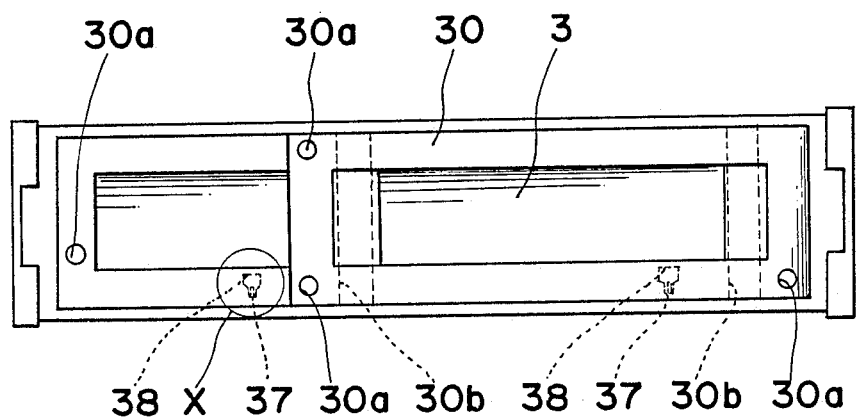
FIG. 9 is a plan view illustrating a common mount which is incorporated into a bottom plate.
Figure 11:
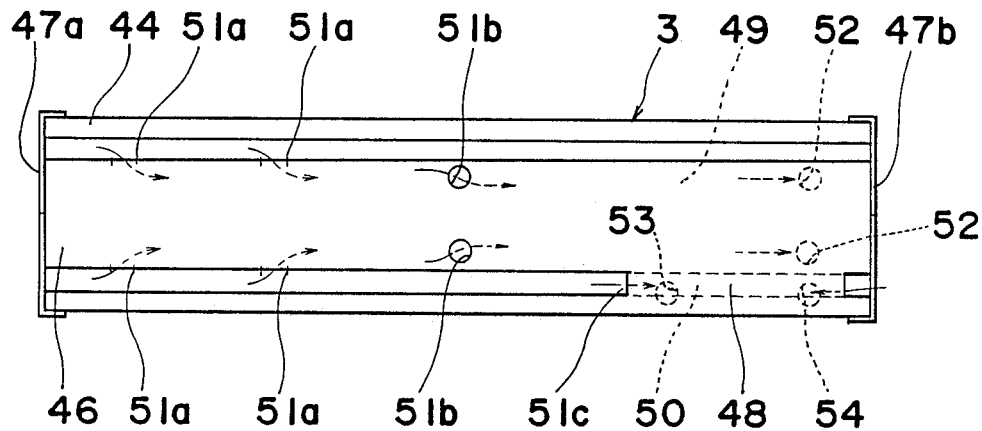
Figure 12:
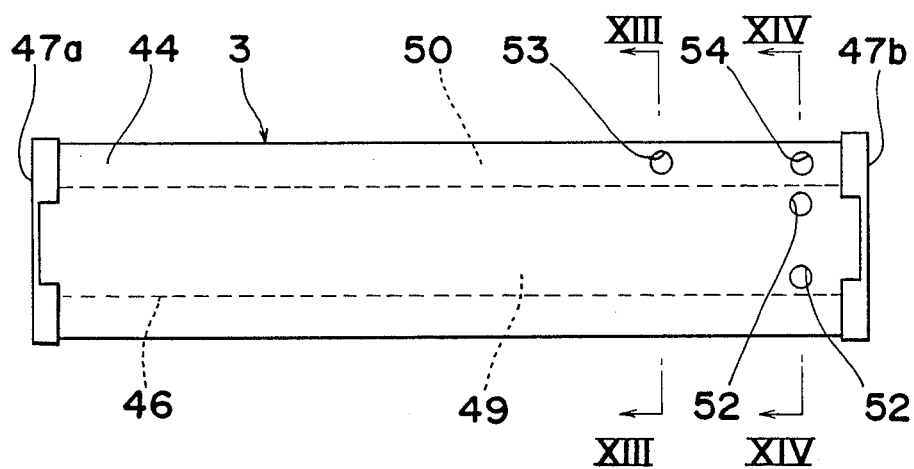
Figure 13:
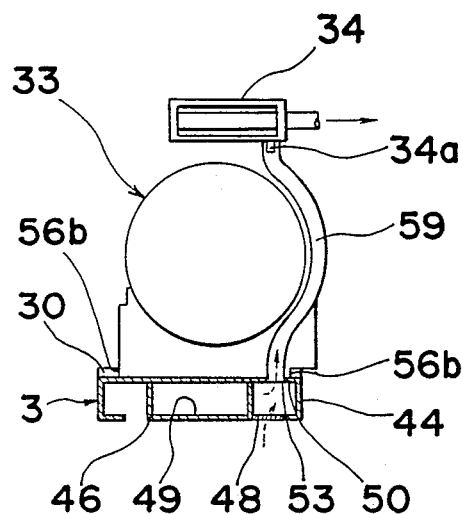
Figure 14:
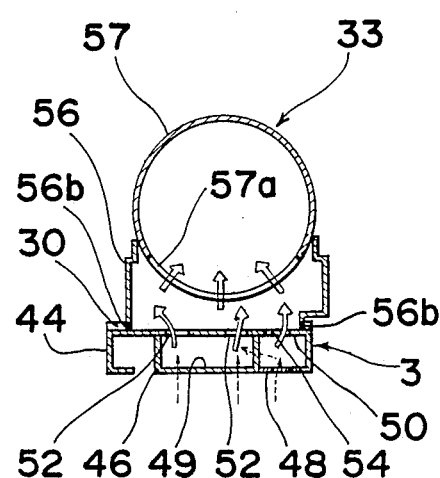
Figure 15:
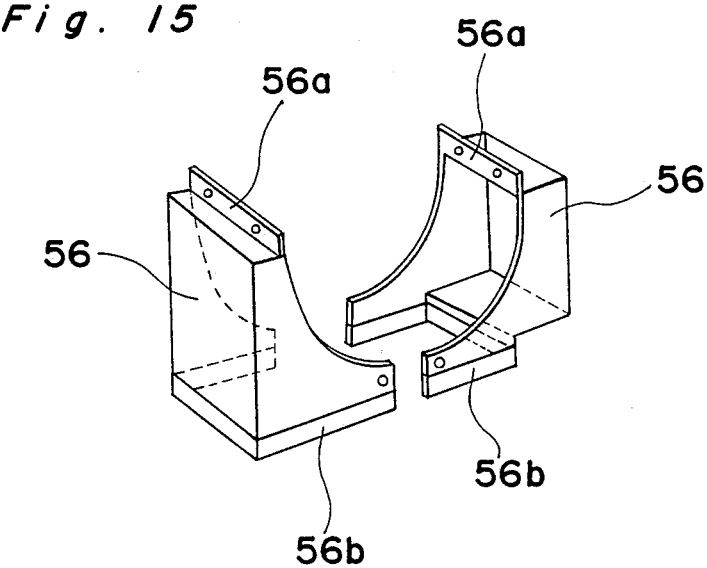
Figure 16:
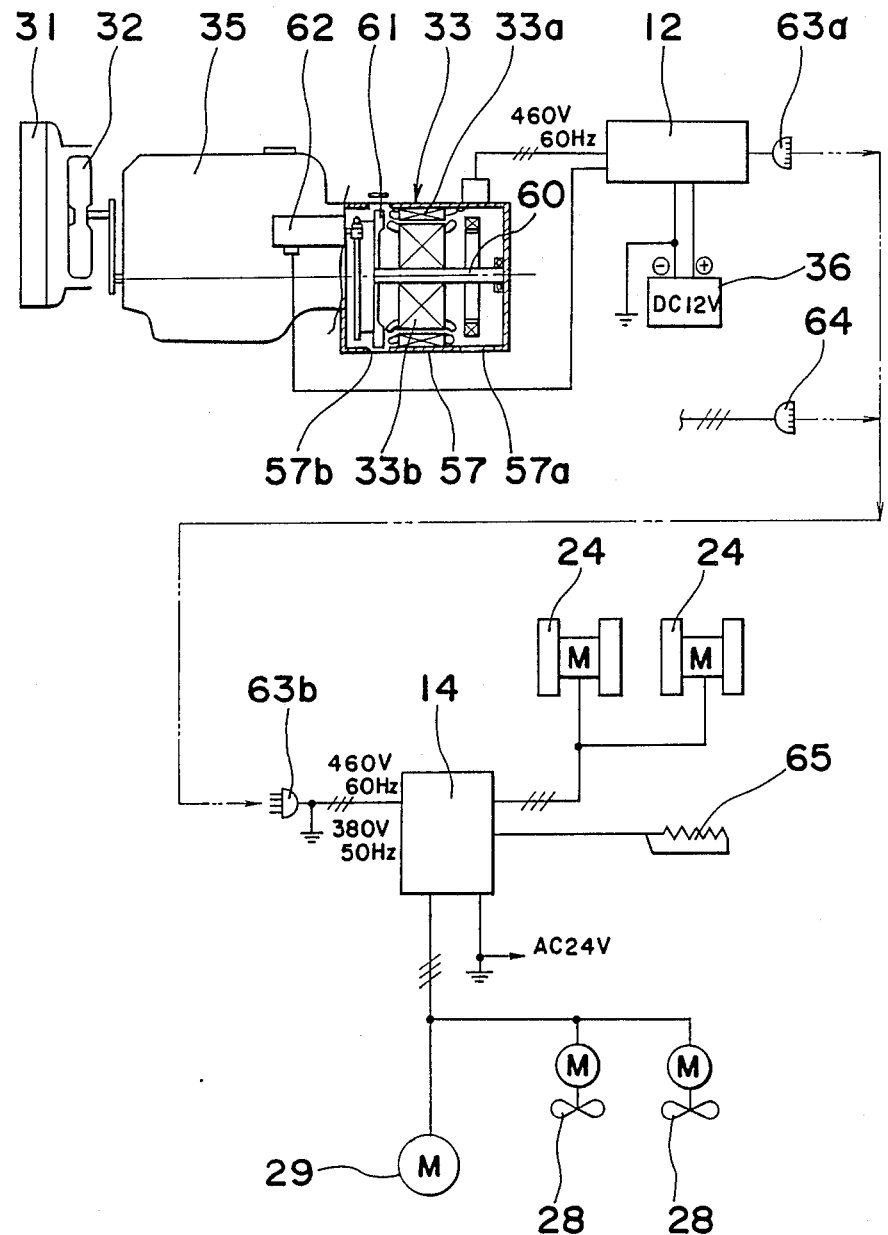
Figure 18:
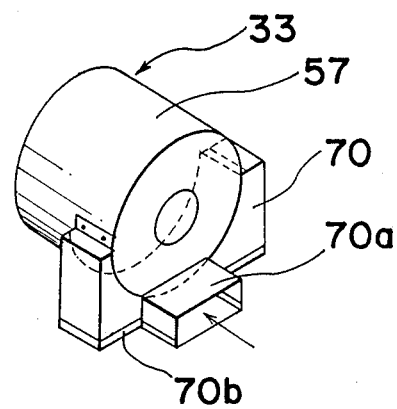
Figure 19:
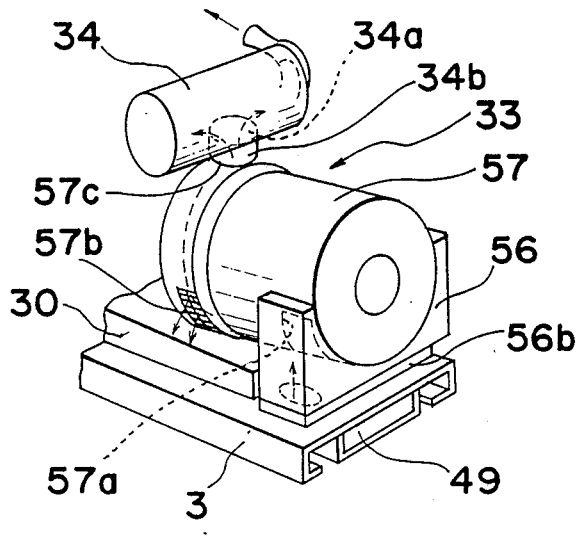
Figure 20:
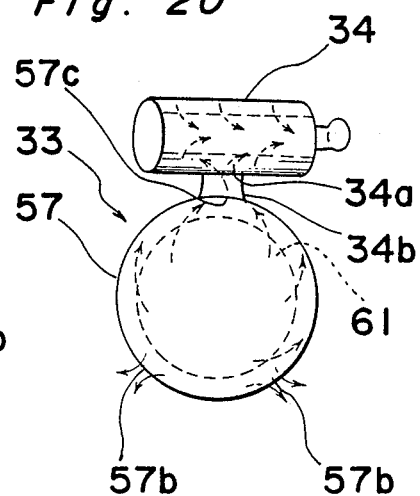
Figure 21:
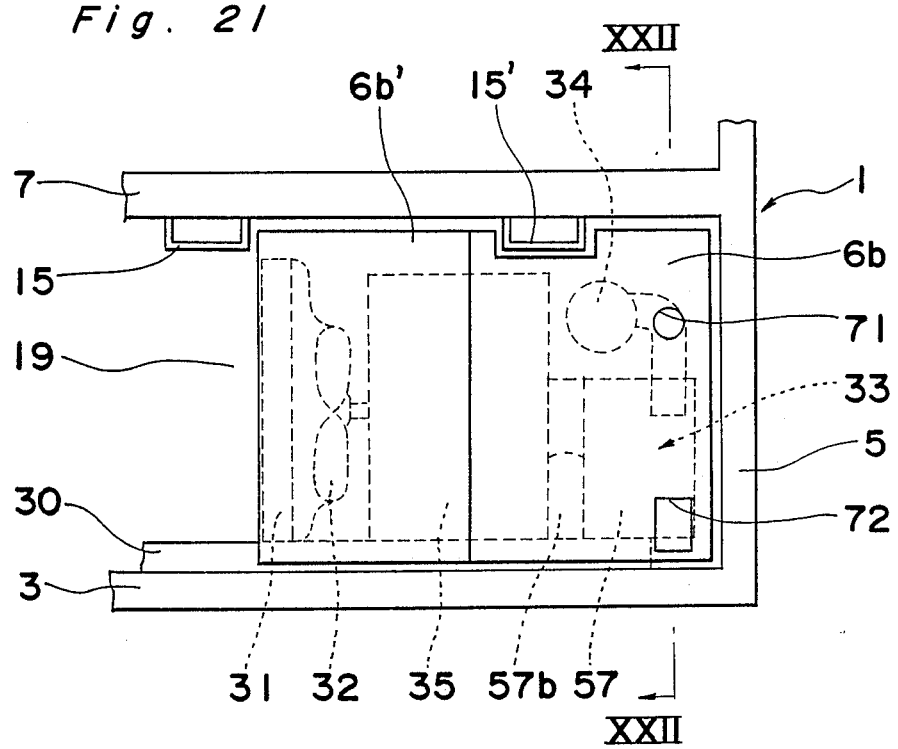
Figure 25:
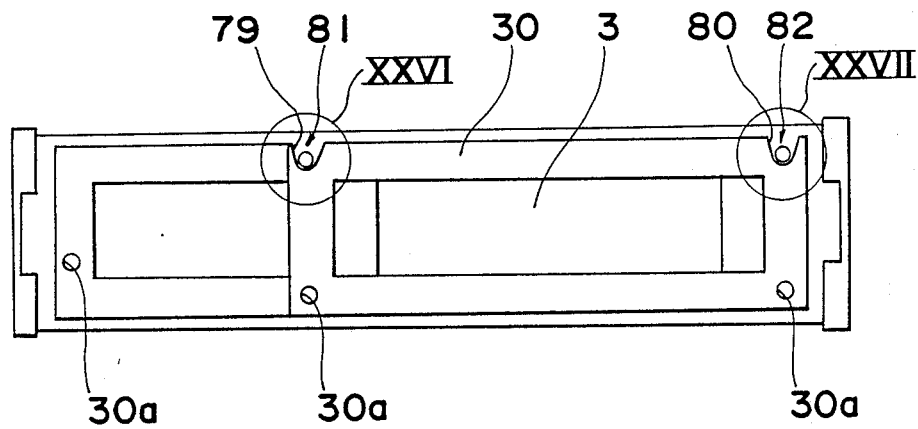
Figure 26A:
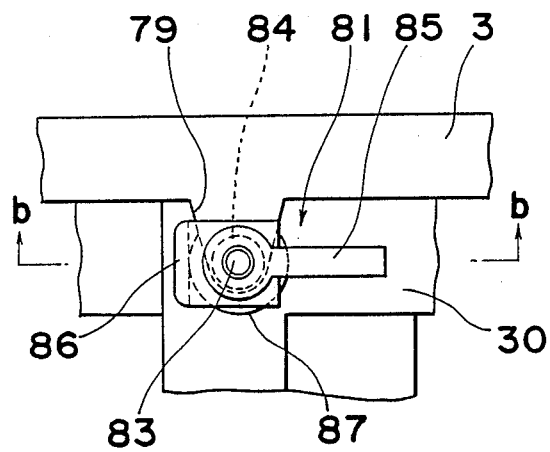
Figure 26B:
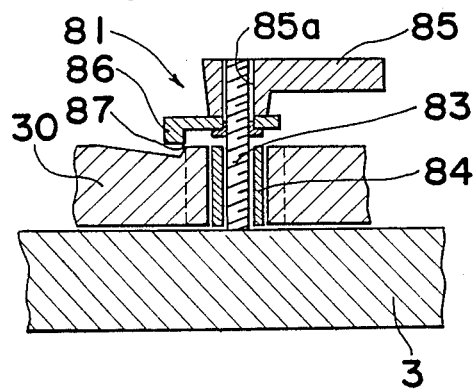
Figure 28:
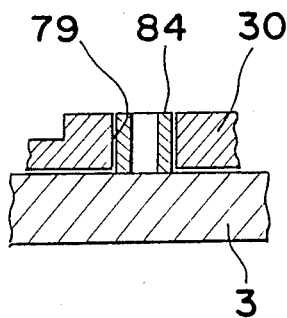
Figure 29:
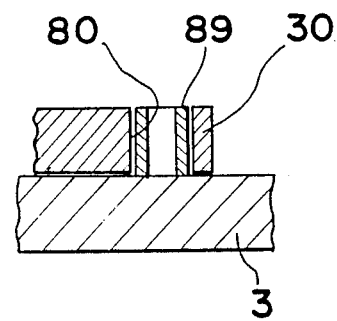
Figure 30:
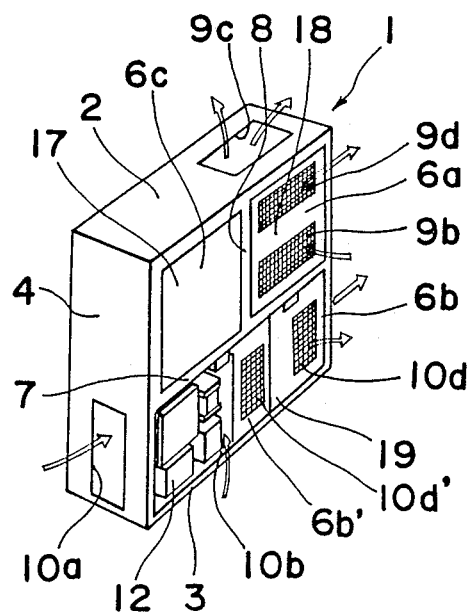
Figure 31:
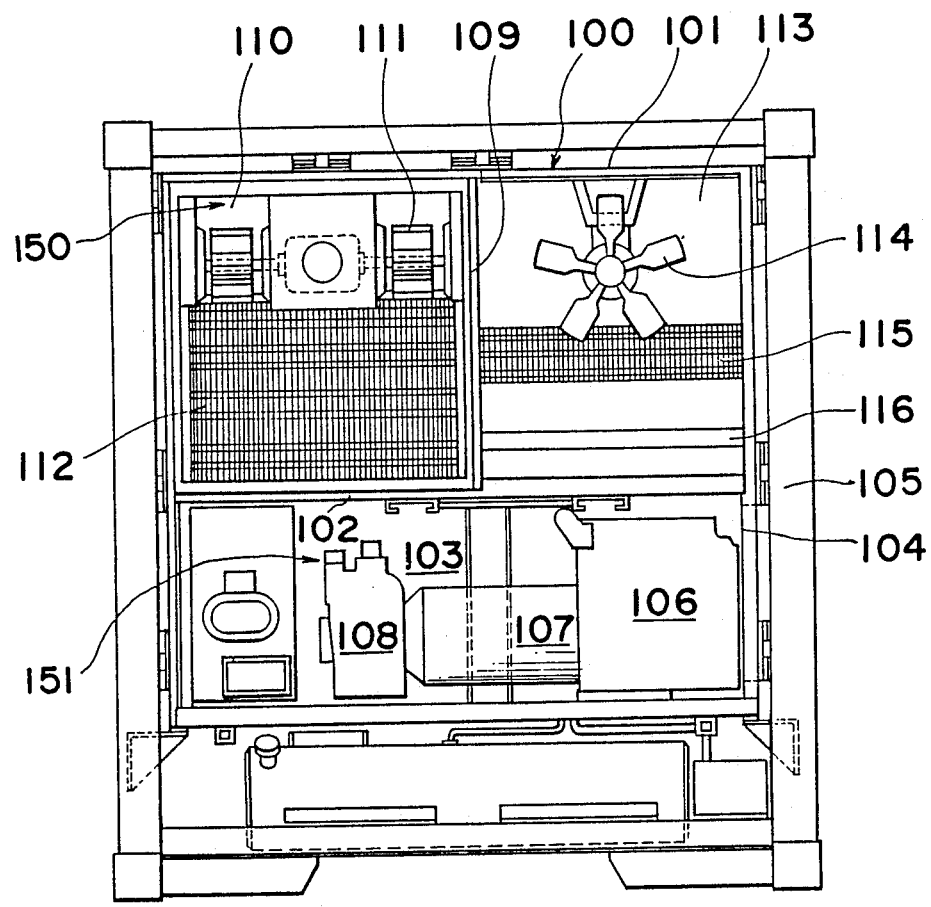

FIGS. 10 (a), (b), (c), (d) and (e) are detail views of the portion X in FIG. 9;

FIG. 11 is a view in the direction of the line XI—XI in FIG. 4;

FIG. 12 is a sectional view taken on the line XII—XII in FIG. 4;

FIG. 13 is a sectional view taken on the line XIII—XIII in FIG. 12;

FIG. 14 is a sectional view taken on the line XIV—XIV in FIG. 12;

FIG. 15 is a perspective view of a duct of a generator casing;

FIG. 16 is a block diagram illustrating an electrical system of the refrigeration apparatus for a transport container;

FIGS. 17 (a), (b) and (c) are detail views of an exhaust passage of fork insertion pipes;

FIG. 18 is a perspective view illustrating an example modification of the duct for the generator casing;

FIGS. 19 and 20 are drawings illustrating the connection structure connecting the duct of the generator casing and an air cleaner;

FIG. 21 is a front view illustrating an example modification of the air passage of a lower compartment;

FIGS. 22 (a) and (b) are sectional views taken on the line XXII—XXII in FIG. 21;

FIG. 23 is a plan view of an example modification of an air intake duct;

FIG. 24 is a side view of the same example modification of the air intake duct;

FIG. 25 is a plan view illustrating an example modification of the structure in which the common mount is installed on a bottom plate;

FIGS. 26 (a) and (b) are detail views of the portion XXVI in FIG. 25;

FIGS. 27 (a) and (b) are detail views of the portion XXVII in FIG. 25;

FIGS. 28 and 29 are sectional views of an example modification of the installation structure of the common mount;

FIG. 30 is a perspective view illustrating an example modification of the outlet opening of front panels;

FIG. 31 is a front view of a conventional refrigeration apparatus for a transport container.

DESCRIPTION OF THE PREFERRED EMBODIMENTS

Hereinafter the present invention will be described in the detail by referring to embodiments shown in drawings.

Figure 1:
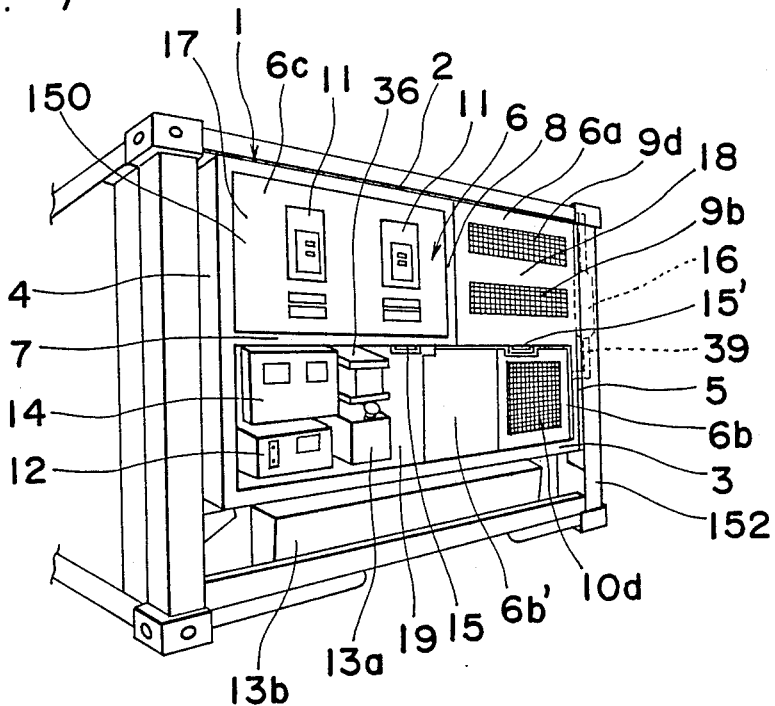
FIGS. 1, 2 and 3 are perspectivve views of a refrigeration apparatus for a transport container according to the present invention.

FIG. 1 illustrates a refrigeration apparatus for a transport container which is mounted on the front wall of a transport container and has a rectangular box 1 including a top panel 2, a bottom plate 3, side walls 4 and 5 opposing each other and a front wall 6 consisting of four detachable front panels, 6a, 6b, 6b' and 6c. The interior of the box 1 is divided into two compartments, that is, an upper compartment 150 and a lower compartment 19, by a horizontal partition 7. The upper compartment 150 is further divided into two chambers, that is, a first upper chamber 17 and a second upper chamber 18, by a vertical partition 8, as seen in the figure.

Figure 2:
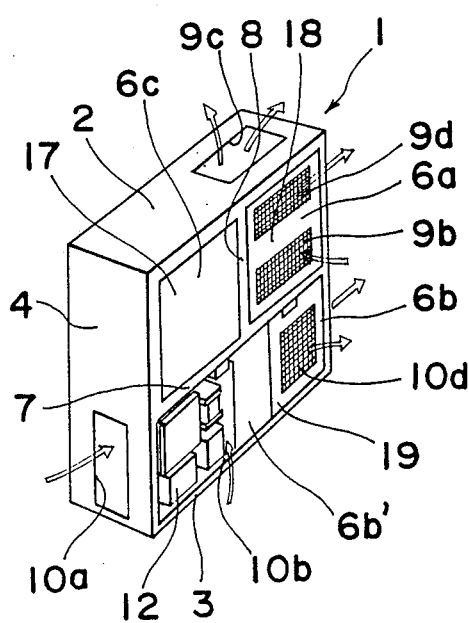
Figure 3:
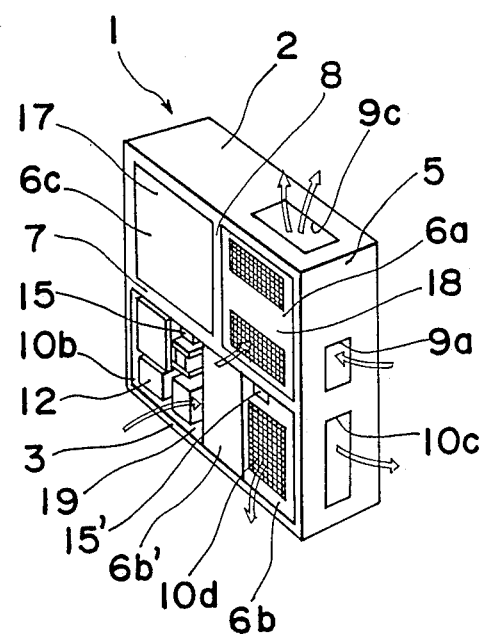

Additionally, as shown in FIGS. 2 and 3, the top panel 2, the side wall 5, the front panel 6a and the partition 7, 8 enclose the above-mentioned second upper chamber 18. The top panel 2 has an air outlet opening 9c, the side wall 5 has an air inlet opening 9a, and the front panel 6a has an air inlet grill 9b and an outlet grill 9d. The side walls 4 and 5, the bottom plate 3 and the partition 7 enclose the above-mentioned lower compartment 19. The side wall 4 has an air inlet opening 10a, the side wall 5 has an outlet opening 10c, and the front panel 6b has an outlet opening 10d. Additionally, one front half of the lower compartment is left open to form an air inlet opening 10b. The front panel 6c on the above-mentioned first upper chamber 17 has slide ventilators 11, as shown in FIG. 1. The bottom plate 3 also serves as a bottom plate of the lower compartment 19. On part of the bottom plate 3, in the proximity of the inlet opening 10a, a generator system controller 12, an auxiliary fuel reservoir 13a, a storage battery 36 and a controller 14 for a refrigeration apparatus are disposed, and additionally, a main fuel reservoir 13b is disposed beneath the bottom plate 3. Further, two fork insertion pocket members 15 and 15' are secured on the under surface of the above-mentioned horizontal partition 7 leaving a horizontal space with respect each other, and an engine silencer 16 is secured on a plate 152 of a container which is opposite to the side wall 5.

Figure 7:
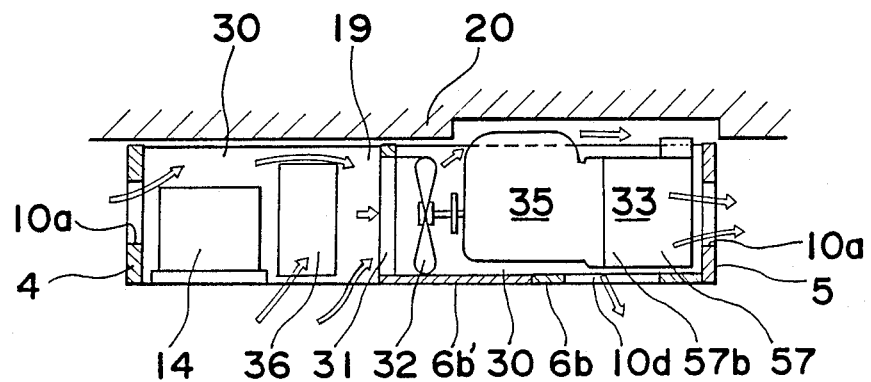
FIG. 7 is a horizontal sectional view taken on the line VII—VII in FIG. 4.
Figure 5:
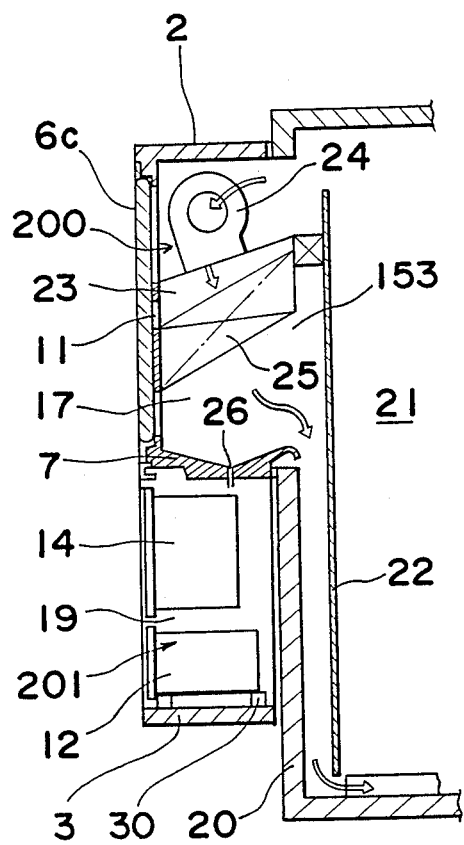
FIG. 5 is a vertical sectional view taken on the line V—V in FIG. 4.
Figure 6:
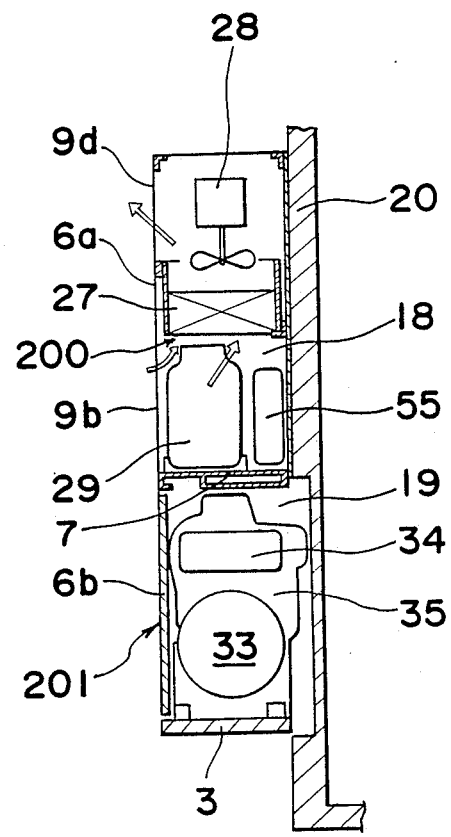
FIG. 6 is a vertical sectional view taken on the line VI—VI in FIG. 4.

FIG. 4 is a front elevation view illustrating the interior of the box with the four front panels removed. FIG. 5 is a vertical sectional view taken on a plane cutting the first upper chamber 17. FIG. 6 is also a vertical sectional view taken on a plane cutting the second upper chamber 18. FIG. 7 is a transverse cross sectional view of the lower compartment 19.

The lower part of the first upper chamber 17 (see FIG. 5) is completely isolated from the lower compartment 19 by the horizontal partition 7, on the other hand, the rear part thereof faces the opening 153 provided in the front wall 20 of a container, and is isolated from the interior 21 of a container by the vertical bulkhead 22 provided in proximity to the front wall 20 of a container. The ceiling and floor portions of the interior 21 of a container are correspondingly connected to the upper and lower portions of the first upper chamber 17 over the upper and lower portions of the bulkhead 20. The upper portion of the first upper chamber 17 is separated by the inclined partition 23, wherein centrifugal fans 24 serving as evaporator fans are disposed on the upper surface of the inclined partition 23, along the entire bottom surface thereof is disposed an evaporator 25 which consists of a coiled tube with fins. Additionally, the horizontal partition 7 in the first upper chamber 17 has a drain hole 26 so as to release water droplets condensed by and fall from the evaporator 25. The second upper chamber 18 is, as shown in FIG. 6, completely isolated from the lower compartment 19 at the lower portion thereof by the horizontal partition 7, while the rear portion thereof is isolated from the interior 21 of the container by the front wall 20 of the container, and a condenser 27 including a coiled tube with fins is provided in the middle between the inlet grill 9b and the outlet grill 9d both of which are provided on the front panel 6a, in order to separate the upper and lower portions of the chamber 18 completely. Additionally, propeller fans 28 serving as condenser fans are disposed above the condenser 27, and a refrigerant compressor 29 with a motor and a receiver 55 are positioned on the horizontal partition 7. The evaporator 25, the refrigerant compressor 29, the condenser 27 and the receiver 55 are connected by piping (not shown), and the receiver 55 and the evaporator 25 are connected through an expansion valve (not shown), constituting a refrigeration cycle. Thus, a refrigeration assembly 200 comprising the components 24, 25, 27, 29 and 55 disposed in the upper first chamber 17 and the second upper chamber 18 within the box 1 is completely isolated from a generator assembly 201 disposed in the lower compartment 19 and described below.

Figure 8:
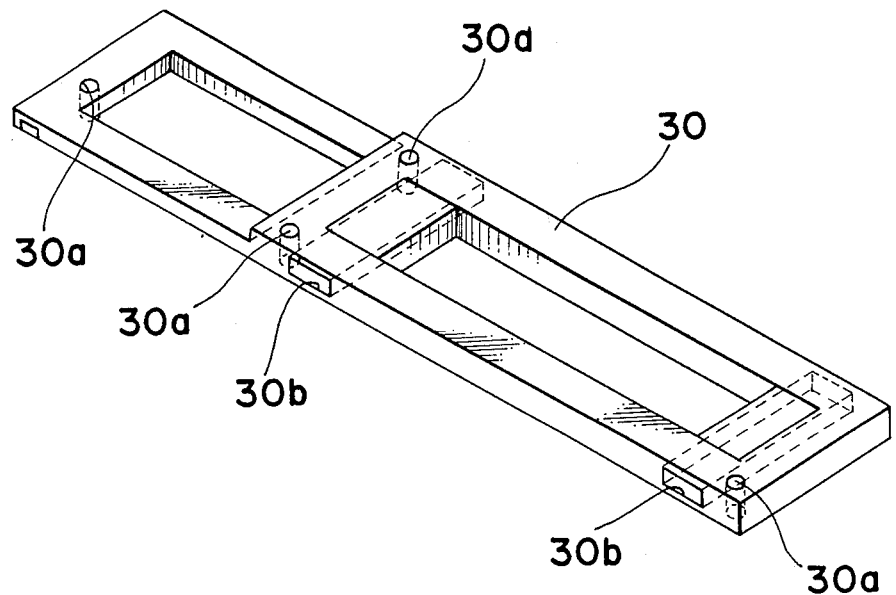
FIG. 8 is a perspective view of a common mount.

As shown in FIG. 8, a common mount 30 having four through holes 30a, for bolts in the peripheral portion thereof and two fork insertion pockets 30b and 30b are secured with unshown bolts on the bottom plate 3 illustrated in FIG. 4. As shown in FIGS. 4 and 7, an engine radiator 31 is mounted in the middle of the common mount 30, and a Diesel engine 35 is also mounted on the mount 30 in an in-line relation to one side of the radiator. A radiator fan 32 is fitted on a first side shaft of the Diesel engine 35. Additionally, a generator 33 is connected to the second side drive shaft of the Diesel engine 35, and an air supply cleaner 34 is disposed above the generator 33. The revolving radiator fan 32 moves air sequentially through the radiator 31, the radiator fan 32, the engine 35 and the generator 33. As shown in the lower portion of FIG. 4 and in FIG. 7, an auxiliary fuel reservoir 13a with a storage battery 36 is mounted on the common mount 30. In addition, to the left of the auxiliary fuel reservoir 13a, a generator controller 12 is provided. Thus, the generator controller 12 provided on one end of the common mount 30 is so disposed that it may be close to the inlet opening 10a on the side wall 4. Likewise, the generator 33 is so disposed that it may be close to the outlet opening 10c on the side wall 5. The refrigeration controller 14 for a refrigeration system provided in the upper chambers 17 and 18 is disposed above the generator controller 12 on the side wall 4. Consequently, the air, before flowing into the radiator 31, effectively cools the refrigeration controller 14 and the generator controller 12. Further, as shown in FIG. 7, the front panel 6b completely covers the front face between the engine radiator 31 in the lower compartment 19 and the side wall 5. An outlet opening 10d on the front panel 6b is located in the vicinity of outlet 57b of a an cooling fan provided in the front portion of the generator casing 57. This arrangement allows the air, after moving over the Diesel engine 35 to cool the engine, to flow out of the outlet opening 10d, enhancing the cooling effect on the Diesel engine 35. However, an outlet opening may also be provided respectively for an engine and a generator.

Figure 10A:
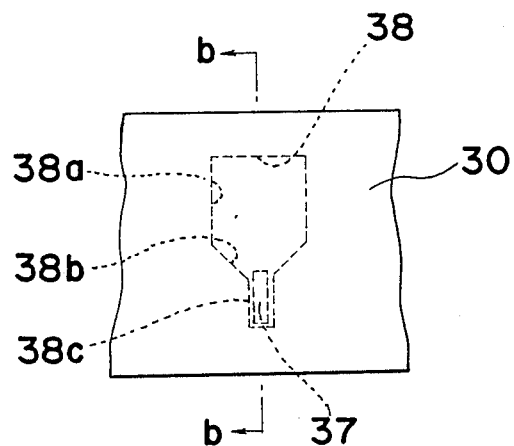
Figure 10B:
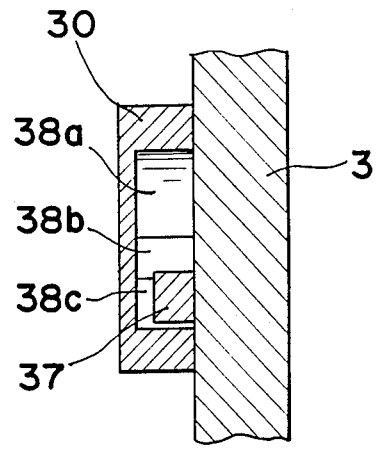
Figure 10C:
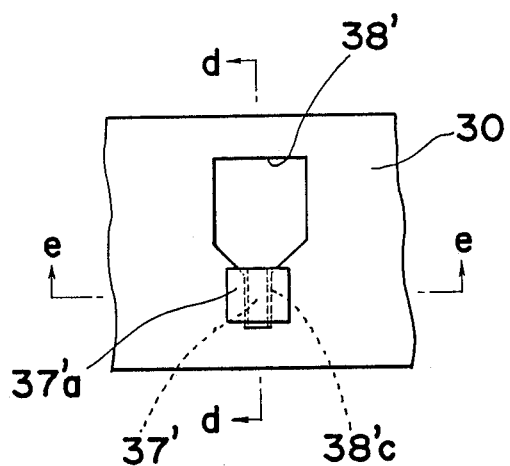
Figure 10D:
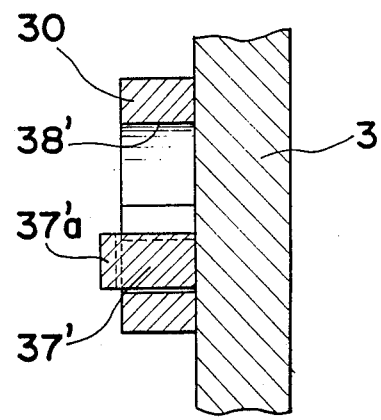
Figure 10E:
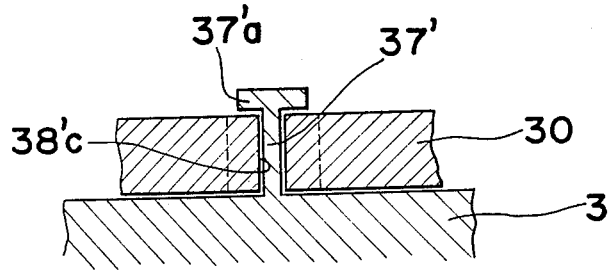

FIG. 9 shows the construction with which the common mount 30, with the generation system mounted on it, is secured on the bottom plate 3. The bottom plate 3 has four bolt holes corresponding to four through holes 30a provided on the common mount 30. In addition, each bolt hole of the bottom plate 3 is provided with female threading. As shown in FIG. 9, on the front portion of the bottom plate 3, two projections 37 are disposed in a longitudinally spaced relation to each other, and two recesses 38 having the shape of a rectangular table tennis racket are so provided on the bottom surface of the common mount 30 that they may correspond with the projections 37. A broader portion 38a of the recess 38 of the common mount 30 is designed to engage loosely onto the projection 37 extending from the bottom plate 3. When the common mount 30 which loosely engages the broader portions 38a onto the projections 37, 37 is shifted through a position corresponding to tapered portions 38b of the recesses 38 to a position corresponding to narrower portions 38c of the recesses 38 the four through holes 30a are set in place, enabling easy and correct mounting of the common mount 30 on the bottom plate 3. FIGS. 10c, 10d and 10e show a modification of the embodiment shown in FIGS. 10a and 10b. In the modification, similar through holes 38' with the shape of a rectangular table-tennis racket are provided on the common mount 30, and, T-sectioned projections 37' are provided on the common mount 30 (see FIG. 10e). When the projection 37' closely engages the narrower portion 38'c of the through hole 38', the upper portion 37'a of the projection 37' closely secures the common mount 30, preventing the latter from rising.

FIG. 11 is a bottom plan view of the bottom plate 3 of the lower compartment 19. FIG. 12 is a plan view of the same plate 3. FIGS. 13 and 14 are sectional views of the bottom plate 3 with the common mount 30 having the generator 33 mounted on it. As shown in FIGS. 13 and 14, the bottom plate 3 is fitted with a U-sectioned channel 46 in the central portion of a generally square sectioned frame member 44, and the each end of the bottom plate 3 is shut with covers 47a and 47b. The portion of the bottom plane of the bottom plate 3 is shut with a cover 48, which defines ducts 49 and 50 so as to form outside air introduction passages. Additionally, as shown in FIGS. 11 to 14, the duct 49 has air inlet 51a at both sides, air inlet 51b and 51c at its bottom, outlet 52 on the upper surface in the vicinity of the cover 47b. The duct 50 has outlet 53 and 54 on the upper surface. Such an arrangement involving covers 47a, 47b, air inlets 51a, 51b and 51c and outlets 52, 53 and 54 allow the air flowing through the ducts 49 and 50 to cause air flow shown by arrows in FIG. 11, enabling separation of rain water on sea water from air containing the rain water or sea water. Additionally, a bottom plate may, instead of the structure involving ducts as shown in FIGS. 11 to 14, be a single flat plate with two through holes one of which is connected to the inlet 57a of the generator 33 via a duct, and the other of which is connected to the air inlet 34a of the air cleaner 34 via the other duct. Additionally, as shown in FIG. 15, two intake ducts 56 and 56 respectively having a mount 56a at the upper edge thereof and a rubber seal 56b at the bottom edge thereof are provided on the lower end of the generator casing 57 (FIG. 4). As shown in FIG. 14, the outlets 52 and 54, connect with an air inlet 57a for an internally mounted cooling fan 57 located within the lower portion of the generator casing 57 through the enclosed intake duct 56. Further, as shown in FIG. 13, an air intake pipe 59 connects between the exhaust outlet 53 and the air inlet 34a of the air cleaner 34.

FIG. 16 illustrates a block diagram of an electrical system in the embodiment of the refrigeration apparatus according to the present invention. As shown in the figure, a generator 33 joined to the drive shaft of the Diesel engine 35 has a cooling fan 61 at one end of a shaft 60 thereof, and is equipped with a starter 62 connected to the generator controller 12. The casing 57 is adapted to introduce outside air through an air inlet 57a in one side of the generator casing 57 and to exhaust the air through an exhaust outlet 57b on the other side of the casing 57, cooling a stator 33a, a coil of a rotor 33b and other components. The engine 35 is so arranged that it is started by a storage battery 36 connected to the generator controller 12. The electricity generated at the generator 33 is transmitted to the generator controller 12 and outputted through a connector receptable 63a connected to the controller 12. The refrigeration controller 14 is so arranged that it receives the generated electricity through the connector receptable 63a or it receives externally provided commercial electricity through a connector plug 63b, and that it supplies such an electricity to centrifugal fans 24 and 24, an electric heater 65, propeller fans 28 and 28, a refrigerant compressor 29 and other control equipment, and that it controls all the equipment mentioned above.

FIG. 17 (a) illustrates one fork insertion pocket member 15' secured on the undersurface of the horizontal partition 7. In the fork insertion pocket 15', through holes 66a, 66a, . . . (FIG. 17 (b)) are disposed on the opposite sides thereof, and through holes 66b, 66b, . . . (FIG. 17 (c)) are disposed on the bottom face thereof, and a cover 67 closes the rear face thereof, in order to guide a portion of warmed exhaust flowing in the downstream of the radiator fan 32 from the through holes 66a, 66b, through the interior of the fork insertion pocket member 15' to the front end thereof and discharge to atmosphere, as shown by the arrows in the figures.

The refrigeration apparatus with the above-mentioned construction operates as follows.

Figure 17A:
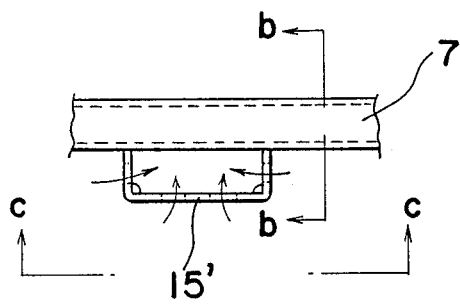
Figure 17B:
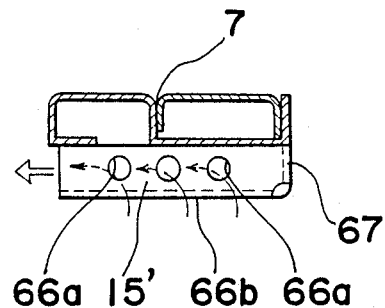
Figure 17C:
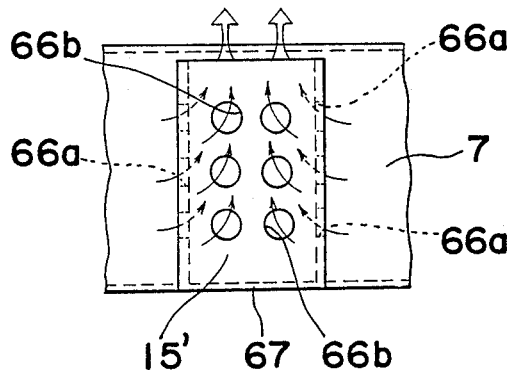

The storage battery 36 energizes the starter 62 through the generator controller 12 in order to start the Diesel engine 35. (FIG. 16). In a marine atmosphere containing sea water, for the air is drawn into the duct 50 provided within the bottom plate 3 as shown by the arrows in FIG. 13. The sea water in the air is removed to a great extent as the air flows through a winding passage having an exhaust outlet 53 and an air inlet 59. Then, the air is supplied to the diesel engine 35, after being purified by an air cleaner 34. At about the same time, a diesel fuel is fed into the diesel engine 35, allowing the engine 35 to start. During operation, a revolving radiator fan 32 secured to one end of the shaft of the engine 35 draws fresh air, as shown by arrows in FIG. 7, through the inlet 10a and the inlet 10b on the front face of the lower compartment 19. The fresh air cools the engine radiator 31 and then the diesel engine 35, thereafter becoming warm air. A portion of the warm air goes out of the outlet 10d. Another portion of the air further cools the generator casing 57 and goes out of the outlet 10c. Additionally, as shown in FIGS. 17(a), 17(b) and 17(c), a portion of the warmed air flowing above the Diesel engine 35 in FIG. 4 flows in the direction of the arrows via through holes 66a on the opposite sides of the fork insertion pocket member 15' and via through holes 66b on the bottom face thereof into the interior of the pocket member 15'. After passing through the pocket member 15', the air flows out of the end of the pocket member 15' into the atmosphere, enhancing the cooling effect on the Diesel engine 35. The cooling fan 61 (FIG. 16) on the generator 33 is driven by the Diesel engine 35 and draws air through the air inlet 51a and 51b for the duct 49 provided within the bottom plate 3. After a salt water within the air is almost completely removed while the air is flowing through the outlet 52, 54 and the interior of a duct 56, the air is then directed into the air inlet 57a on the generator casing 57 (FIG. 16). After cooling the components in the generator casing 57, the air is discharged to the atmosphere through the outlet 57b on the generator casing 57, and next, through the outlet opening 10d.

The electricity generated by the generator 33 energized by the Diesel engine 35 is, as shown in FIG. 16, supplied to each component contained in the refrigeration apparatus, and each component is controlled by the refrigeration controller 14. As illustrated in FIGS. 5 and 6, the evaporator 25 and the condenser 27 constituting a refrigeration cycle are supplied with refrigerant by a refrigerant compressor that is energized by an internally mounted motor, whereby the evaporator 25 absorbs heat and the condenser 27 discharges heat. The centrifugal fan 24 in the first upper chamber 17 transfers air, drawn from the interior of the container 21 through the ceiling portion of the container 21, then through the evaporator 25 which is operating to absorb heat, thereby cooling the air. The cooled air is blown into the floor portion of the interior of the container 21, so as to circulate air for refrigeration. The slide ventilator 11 on the front panel 6c replaces a part of the circulating air in the container with outside air. Droplets formed on the evaporator 25 fall into the lower compartment 19 through the drain hole 26 provided in the horizontal partition 7. The propeller fan 28 provided within the second upper chamber 18 draws outside air through an air inlet grill 9b on the front panel 67a and the air inlet opening 9a on the side wall and transfers the air to a condenser 27 which is operating to radiate heat, in order to cool the condenser 27. The air heated by this process is released into the atmosphere through the exhaust grill 9d as well as the exhaust outlet opening on the top panel 2.

As condenser 27 constituting a part of the refrigeration system is independently disposed in the compartment 18 in the box 1, and, as the generator system including the engine radiator 31, the Diesel engine 35, the generator 33 and other components are independently disposed in the compartment 19 in the box 1, and further, as each system has independent cooling air passages to each other, exhausted hot air from passages in one system does not exert adverse effects on air cooling efficiency in passages of the other system. Additionally, the generator controller 12, refrigeration controller 14 containing electronic parts and an auxiliary fuel reservoir 13a are located in the upstream side of the engine radiator 31, these components do not fail or malfunction due to the exhausted hot air.

Next, when installing the common mount 30 (FIG. 4) having the generator assembly 201 on the bottom plate 3 of the lower compartment 19, a pair of forks are inserted into the fork insertion pocket members 30b and 30b, and the common mount 30 is lifted and transported by a fork lift truck. Then, the common mount 30 is placed in the position on the bottom plate 3 as shown in FIG. 9. More precisely, the common mount 30 is at first positioned so that both projections 37 on the bottom plate 3 respectively are fitted into the broader portion 38a of both recesses 38 on the common mount 30. Next, the forks on the fork lift truck slowly advance the common mount 30 to the back of the lower compartment 18, so that both projections 37 are respectively guided along the tapered portion 38b of both recesses 38 until both projections 37 respectively tightly engage into the narrower portions 38c of the recesses 38, correctly positioning the common mount 30. Then, the four through holes 30a provided on the common mount 30 and the four bolt holes provided on the bottom plate 3 are aligned with each other, wherein four bolts are fastened so as to secure the common mount 30 tightly to the bottom plate 3. An exhaust pipe 39 of the Diesel engine 35 on the common mount 30 is connected to a silencer 16 secured on a container wall opposite the side wall 5 with a proper joint so as to make the exhaust pipe 39 detachable. Additionally, when the common mount 30 is removed from the bottom plate 3, the above-mentioned procedure is employed in reverse order.

Consequently, the Diesel engine 35, radiator 31, radiator fan 32, generator 33, generator controller 12, auxiliary fuel reservoir 13a and storage battery 36 are commonly installed on the common mount 30 to form one entity that may be readily removed from the box 1 in case of an inspection or repair work of the generator system, or if a commercial power supply is available during the transportation of a container.

As discussed above, with the disclosed embodiment, the common mount 30 disposes on the upper surface thereof, as viewed from the upstream side of air flow, the generator controller 12, auxiliary fuel reservoir 13a, storage battery 36, engine radiator 31, radiator fan 32, Diesel engine 35 and generator 33. The common mount 30 with its components mounted thereto is secured to the bottom plate 3 of the lower compartment 19 within the box 1 with four bolts. Various openings are provided on the apparatus. Such openings include the inlet opening 10a on the side wall 4 of the lower compartment 19, the inlet opening 10b on the front face of the lower compartment 19, the outlet opening 10d on the front panel 6b and the outlet opening 10c on the side wall 5. Additionally, the through holes 66a and 66b serving as exhaust passages are provided on the fork insertion pocket member 15'. The cooling air passage for the generator system involving the above-mentioned openings is completely isolated from the other cooling air passages for the condenser 27 forming a part of the refrigeration system which is provided within the upper chambers 17 and 18, and is completely independent of the generator cooling air passage (49→52→56→57a→57b; 49→54→56→57a→57b) and the supply air cleaner passage (50→53→59→34) both of which run through a duct formed within the bottom plate 3. Consequently, the generator controller 12 containing electronic parts, for example, in the upstream side does not overheat and malfunction under any adverse effect of exhausted hot air, and exhausted hot air from one air passage does not adversely affect cooling air in the other air passage. Introduction of cool outside air improves the outputs of the engine and generator while any, sea water contained within the outside air is removed while the air flows through the above-mentioned duct, eliminating any adverse effect on the generator or engine. Additionally, the common mount 30 has recesses 38 in the shape of a table tennis racket which are used to position the through holes 30a for mounting bolts and the fork insertion pocket 30b. The common mount 30 may be readily and promptly installed on or removed from the bottom plate 3 of the lower compartment 19 without causing damage. This feature is very advantageous, especially for inspection or repair work. As all the necessary components for the generator system are mounted on the common mount 30 as one unit, a test run for the generator system removed from the box 1 may be conveniently exercised when required. Further, if a commercial power supply is available other than the built-in generator system, the common mount 30 may be removed from the box 1 in order to make the interior of the above-mentioned lower compartment almost empty, increasing the maximum loading capacity of a transport means.

FIGS. 18 to 24 illustrate modifications of an air passage connected to the generator 33 and supply air cleaner 34. As shown in FIG. 18, a duct 70 enclosing air inlet is provided on the end portion of the casing 57 of the generator 33, and in the bottom middle part of the end face of the duct 70 is provided to an air inlet opening 70a which introduces outside air in the direction of an arrow and which protrudes from the side wall 5. The bottom rim which directly contacts the bottom plate 3 is provided with a rubber seal 70b.

With the modification in FIGS. 19 and 20, the duct 56 and some components are identical to those illustrated in FIG. 15. However, this modification has, instead of the duct 50 and the air intake pipe 59 provided within the bottom plate 3, illustrated in FIG. 13, a through hole 57c, which serves as an exhaust outlet corresponding to the outlet portion of the cooling fan and located in the upper portion of the front face of the generator casing. The air outlet 57c connects with an air inlet 34a of the air cleaner 34 through an air intake duct 34b in order to supply a portion of warm air blowing from a cooling fan 61 to the air cleaner 34, simplifying the system.

Figure 22A:
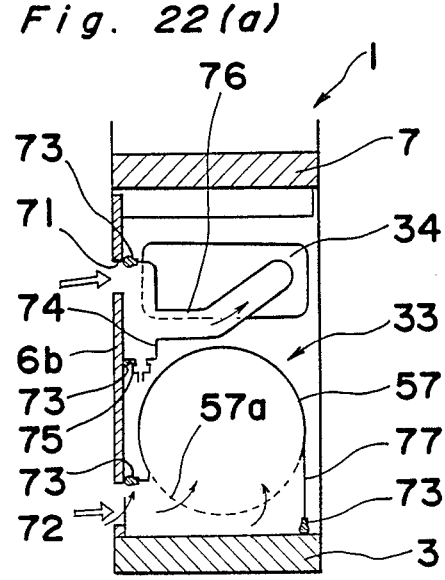
Figure 22B:
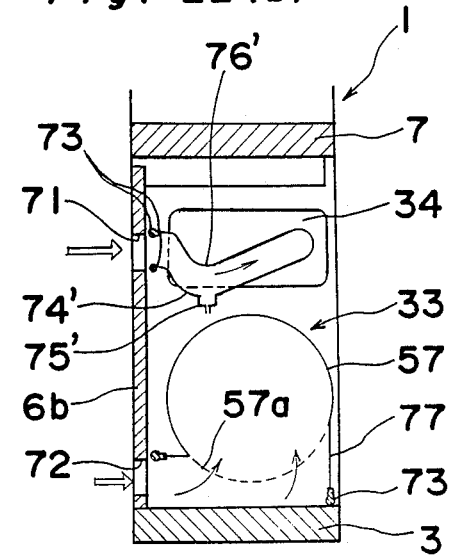

FIG. 21 shows a front view of the lower compartment 19 with the front panels 6b and 6b' installed. In FIG. 22(a) illustrating a cross section of the figure above, the bottom plate 3 has, instead of an internally formed duct shown in FIGS. 13 and 14, an air inlet opening 71 for air cleaner 34 in the downstream side of the upper portion of the front panel 6b and an air inlet 72 for a cooling fan of a generator in the lower portion of the downstream side of the front panel 6b. Additionally, as shown in FIG. 22(a), the air inlet 71 and the air cleaner 34 are connected by a duct 76 which has rubber seals 73 in the area contacting the front panel 6b and a depressed drain 74 equipped with a drain tube 75 on the lower end to release water. Additionally, the air inlet 72 and an air inlet 57a of the generator casing 57 are connected by a duct 77 having rubber seals 73 similar to ones in the above description. A modification in FIG. 22(b) is similar to the one in FIG. 22(a), except that the shape of a duct 76' is somewhat different from that of the ducts 76. Such a construction allows sea water contained in outside air to be effectively removed in the ducts 76 and 76' while the outside air introduced from the air cleaner 34 and the generator casing 57 flows through the duct 76 and 76'. Sea water collected in the drains 74 and 74' of the ducts 76 and 76' respectively may be released by disconnecting the drain tubes 75 and 75'.

FIG. 23 shows a plan view of a modified air inlet duct for the air cleaner 34. FIG. 24 is a front view of the duct. The air inlet duct 78 runs from an air intake 34a along the upper surface of a Diesel engine 35, then bends and extends to the proximity above the front face of the engine radiator 31. This feature enables the fresh outside air free separate from the exhausted warm air to be supplied to the Diesel engine 35, thereby improving the output of the engine.

Figure 27A:
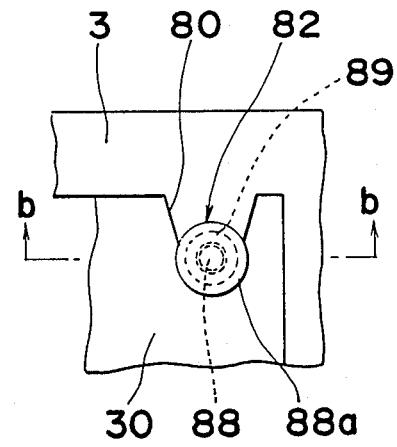
Figure 27B:
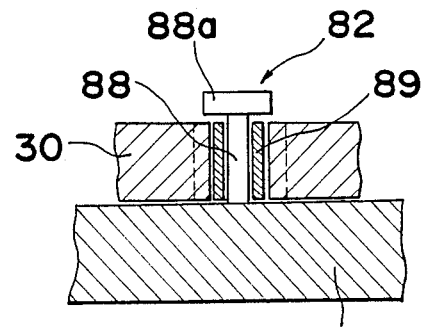

FIGS. 25 to 27 respectively show a plan view and partially detail views of a modified construction with which the common mount 30 with a generator assembly installed is secured on the bottom plate 3 of the lower compartment. As shown in FIG. 25, the common mount 30 has three through holes 30a longitudinally spaced with respect to each other for securing bolts on the front portion of the bottom plate 3. Additionally, the bottom plate 3 has three female-threaded through holes corresponding to counterparts on the common mount 30. Two recesses 79 and 80 are provided on the rear face of the common mount 30. Guide means 81 and 82 respectively corresponding to the recesses 79 and 80 are provided so as to protrude from the bottom plate 3. As shown in FIGS. 26(a) and (b), the guide means 81 beyond a portion of a male screw 83 on the bottom plate 3. A freely rotating guide roller 84 is fitted to enclose a lower portion of the male screw 83. The upper portion of the male screw 83 is engaged with a female screw 85a which is formed in a lever 85. The lever 85 has a tightening hook 86 for damping down the common mount 30 to the bottom plate 3. By turning the lever 85, the tightening hook 86 rotates and lowers so that the hook 86 is tightly engaged with a groove 87 provided on the upper circumference of the recess 79 on the common mount, tightly securing the common plate 30 on the bottom plate 3. Additionally, as shown in FIGS. 27(a) and 27(b), the guide means 82 is so constructed that it has a pin 88 protruding from the bottom plate 3 and involving a collar 88a on the upper portion and a guide roller 89 which freely rotates and encloses the lower portion of the pin 88. According to such a construction, the common mount 30 installed on the position illustrated in FIG. 25 is smoothly guided by freely rotating guide rollers 84 and 89 in contact with recesses 79 and 80 to the correct mounting seat corresponding to each tip of the recesses, and three holes for mounting bolts are readily and correctly adjusted to their counterparts.

Further, as shown in FIGS. 26(a) and (b) as well as in FIGS. 27(a) and (b), the guide roller 84 is engaged with the male screw 83, and the guide roller 89 is engaged with the pin 88, in order to guide the common mount 30 smoothly through the recesses 79 and 89. However, as shown in FIGS. 28 and 29, guide members 84 and 89 may be welded to the bottom plate 3 so that the guide members 84 and 89 can guide the common mount 30 through the recesses 79 and 80.

FIG. 30 illustrates a modification in which front panels 6b and 6b' have outlet openings 10d and 10d, respectively.

As can be understood from the description above, the refrigeration apparatus for a transport container according to the present invention has a box which is mounted on the front wall of a container. The interior of the box is divided into two compartments with a horizontal partition. One compartment disposes an evaporator for air-conditioning the interior of the container, an evaporator fan, a condenser, a condenser fan and a refrigerant compressor, on the other hand, the other compartment disposes an engine radiator, a radiator fan and a generator in in-line relation on a common mount. Additionally, air inlet and exhaust outlet for cooling the engine are provided on the side walls of the box. Thus, as a generator system is mounted on the common mount as a single unit, the generator assembly may be readily installed into or removed from the box with minimum labor, and at the same time, it is made possible to run the assembly for trial outside the box, improving expediency of inspection or repair work, and additionally, enhancing the maximum loading capacity of the means of container transportation. Further, as the refrigeration system and the generator system are respectively accommodated in separate rooms and are completely isolated from each other, and as a cooling air passage for the engine and the generator and a similar passage for the condenser are independent of each other, the exhaust warm air from one passage does not adversely affect the cooling efficiency of the other system. Consequently, high efficient cooling realizes the improvement in outputs of the engine as well as the generator.

The invention being thus described, it will be obvious that the same may be varied in many ways. Such variation are not to be regarded as a departure from the spirit and scope of the invention, and all such modifications as would be obvious to one skilled in the art are intended to be included within the scope of the following claims.

What is claimed is:

1. A refrigeration apparatus for a transport container, comprising:
    a box having top, bottom and first and second side walls which is mountable on a wall of the transport container;
    a partition located in said box divides said box into first and second compartments, said first compartment having a first inlet opening and a first outlet opening and said second compartment having a second inlet opening and a second outlet opening;
    refrigeration assembly means for air-conditioning the interior of the transport container, said refrigeration assembly means is disposed in said first compartment and includes an evaporator, an evaporator fan, a condenser, a condenser fan and a refrigerant compressor, said refrigeration assembly means developing a condenser air flow through the condenser, which is drawn from said first inlet opening of said first compartment and discharged from said first outlet opening of said first compartment;
    a common mount is disposed in said second compartment;
    generator assembly means is located on said common mount and includes an internal combustion engine, an engine radiator, a radiator fan and a generator, said generator assembly means developing a generator air flow there through, which is drawn from said second inlet opening of said second compartment and discharged from said second outlet opening of said second compartment;

said engine, said engine radiator, said radiator fan and said generator being linearly arranged on said common mount;

said condenser air flow developed by said refrigeration assembly means and said generator air flow developed by said generator assembly means having independent paths through respective said first and second compartments of said box, and said generator assembly means being capable of being installed into and removed from said box as one unit.

2. A refrigeration apparatus as claimed in claim 1, wherein said engine radiator, said radiator fan, said engine and said generator are sequentially disposed on said common mount, and said first side wall of said box is provided with said second inlet opening in the upstream side of an air flow through said engine radiator and said second side wall of said box is provided with said second outlet opening in the downstream of said radiator fan.

3. A refrigeration apparatus as claimed in claim 1, wherein a generator controller and a refrigeration controller are disposed in said second compartment in the upstream side of said engine radiator.

4. A refrigeration apparatus as claimed in claim 1, wherein said generator has a casing within which a cooling fan is accommodated and said casing is provided with an air inlet and an air outlet at axially opposite ends of the bottom part thereof.

5. A refrigeration apparatus as claimed in claim 1, wherein a part of a front wall of said box located at said second compartment is constituted by a detachable panel having a third outlet opening.

6. A refrigeration apparatus for a transport container, comprising:
a box having walls which is mountable on a front wall of the transport container and has air inlet openings and air outlet openings provided in said walls of said box;
a partition located in said box divides said box into first and second compartments;
refrigeration assembly means for air-conditioning the interior of the transport container, said refrigeration assembly means is disposed in said first compartment and includes an evaporator, an evaporator fan, a condenser, a condenser fan and a refrigerant compressor;
a common mount is disposed in said second compartment;
generator assembly means is located on said common mount and includes an internal combustion engine cooled by air flowing from said air inlet openings to said air outlet openings, an engine radiator, a radiator fan and a generator;
said engine, said engine radiator, said radiator fan and said generator being linearly arranged on said common mount;
said generator having a casing within which a cooling fan is accommodated and said casing is provided with an air inlet and an air outlet at axially opposite ends of the bottom part thereof;
an intake duct which communicates between said air inlet of said casing and a passage defined on a bottom plate of said box for drawing outside air in from an inlet defined in said bottom plate;

whereby said refrigeration assembly means and said generator assembly means are thermally isolated from each other by said partition, and said generator assembly means can be installed into and removed from said box as one unit.

7. A refrigeration apparatus as claimed in claim 6, wherein said bottom plate includes an outside air inlet passage comprising ducts which are provided with air inlets to draw outside air in from below as well as outlets to exhaust said air upward, and said outlets are communicated with the air inlet in the casing of the generator through said intake duct.

8. A refrigeration apparatus as claimed in claim 7, wherein said bottom plate is provided with an outlet to exhaust upwardly said air coming from said outside air inlet passage, and said outlet is communicated with an inlet of an air cleaner of the engine through an air intake pipe.

9. A refrigeration apparatus as claimed in claim 7, wherein said casing of the generator is provided with an outlet which is located at an upper side of said cooling fan, and is connected to the inlet of the air cleaner through an air duct.

10. A refrigeration apparatus for a transport container, comprising:
a box having walls which is mountable on a front wall of the transport container and has air inlet openings and air outlet openings provided in said walls of said box;
a partition located in said box divides said box into upper and lower compartments;
refrigeration assembly means for air-conditioning the interior of the transport container, said refrigeration assembly means is disposed in said upper compartment and includes an evaporator, an evaporator fan, a condenser, a condenserr fan and a refrigerant compressor;
generator assembly means is removably disposed in said lower compartment and includes an internal combustion engine cooled by air flowing from said air inlet openings to said air outlet openings, an engine radiator, a radiator fan and a generator;
said generator having a casing within which a cooling fan is accommodated and said casing is provided with an air inlet and an air outlet at axially opposite ends of the bottom part thereof;
an intake duct which communicates between the air inlet of the casing and a passage defined on a bottom plate of said box for drawing outside air in from an inlet defined in said bottom plate;
whereby said refrigeration assembly means and said generator assembly means are thermally isolated from each other by said partition, and said generator assembly means can be installed into and removed from said box.

11. A refrigeration apparatus as claimed in claim 10, wherein said bottom plate includes an outside air inlet passage comprising ducts which are provided with air inlets to draw outside air in from below as well as outlets to exhaust said air upward, and said outlets are communicated with the air inlet in the casing of the generator through said intake duct.

12. A refrigeration apparatus as claimed in claim 11, wherein the bottom plate is provided with an outlet to exhaust upwardly said air coming from said outside air inlet passage, and said outlet is communicated with an inlet of an air cleaner of the engine through an air intake pipe.

13. A refrigeration apparatus as claimed in claim 11, wherein said casing of the generator is provided with an outlet which is located at an upper side of said cooling fan, and is connected to the inlet of the air cleaner through an air duct.

14. A refrigeration apparatus for a transport container, comprising:
- a box having walls which is mountable on a front wall of the transport container and has air inlet openings and air outlet openings provided in said walls of said box;
- a partition located in said box divides said box into first and second compartments;
- refrigeration assembly means for air-conditioning the interior of the transport container, said refrigeration assembly means is disposed in said first compartment and includes an evaporator, an evaporator fan, a condenser, a condenser fan and a refrigerant compressor;
- a common mount is disposed in said second compartment;
- generator assembly means is located on said common mount and includes an internal combustion engine cooled by air flowing from said air inlet openings to said air outlet openings, an engine radiator, a radiator fan and a generator;
- said engine, said engine radiator, said radiator fan and said generator being linearly arranged on said common mount;
- a fork insertion pocket member is installed in said partition and is located on the downstream side of the engine radiator and defines through holes so as to discharge forward a portion of warmed air flowing through the engine radiator;
- whereby said refrigeration assembly means and said generator assembly means are thermally isolated from each other by said partition, and said generator assembly means can be installed into and removed from said box as one unit.

15. A refrigeration apparatus for a transport container, comprising:
- a box having walls which is mountable on a front wall of the transport container and has air inlet openings and air outlet openings provided in said walls of said box;
- a partition located in said box divides said box into first and second compartments;
- refrigeration assembly means for air-conditioning the interior of the transport container, said refrigeration assembly means is disposed in said first compartment and includes an evaporator, an evaporator fan, a condenser, a condenser fan and a refrigerant compressor;
- a common mount is disposed in said second compartment;
- generator assembly means is located on said common mount and includes an internal combustion engine cooled by air flowing from said air inlet openings to said air outlet openings, an engine radiator, a radiator fan and a generator;
- said engine, said engine radiator, said radiator fan and said generator being linearly arranged on said common mount;
- a detachable panel is provided with two air inlet openings and is located in the front of said box, wherein one of said air inlet openings is connected to an air inlet of generator through a duct, and said other one of air inlet openings is connected to an air inlet of an air cleaner through ducts;
- whereby said refrigeration assembly means and said generator assembly means are thermally isolated from each other by said partition, and said generator assembly means can be installed into and removed from said box as one unit.

16. A refrigeration apparatus for a transport container, comprising:
- a box having walls which is mountable on a front wall of the transport container and has air inlet openings and air outlet openings provided in said walls of said box;
- a partition located in said box divides said box into first and second compartments;
- refrigeration assembly means for air-conditioning the interior of the transport container, said refrigeration assembly means is disposed in said first compartment and includes an evaporator, an evaporator fan, a condenser, a condenser fan and a refrigerant compressor;
- a common mount is disposed in said second compartment, said common mount is provided with a plurality of through holes for fitting bolts on one side thereof as well as recesses on the rear face of the other side thereof, and a bottom plate of the box is provided with a plurality of through holes for fitting the bolts on one side of the bottom plate as well as a plurality of guide means which are respectively engaged with said recesses on the other side of said common mount;
- a generator assembly means is located on said common mount and includes an internal combustion engine cooled by air flowing from said air inlet openings to said air outlet openings, an engine radiator, a radiator fan and a generator;
- said engine, said engine radiator, said radiator fan and said generator being linearly arranged on the common mount;
- whereby said refrigeration assembly means and said generator assembly means are thermally isolated from each other by said partition, and said generator assembly means can be installed into and removed from said box as one unit.

17. A refrigeration apparatus as claimed in claim 16, wherein one of said guide means includes a male screw fixed on said bottom plate, a freely rotating guide roller for guiding one of the recesses of the common mount and enclosing a lower portion of said male screw, a lever including a female thread is engaged with an upper portion of said male screw, and a tightening hook fixed on said lever and engaged with said common mount, another one of said guide means includes a guide pin fixed to said bottom plate and a freely rotating guide roller enclosing the pin and guiding another one of said recesses of said common mount.

18. A refrigeration apparatus for a transport container, comprising:
- a box having walls which is mountable on a front wall of the transport container;
- a partition located in said box divides said box into first and second compartments, said walls of said box defining said first compartment being provided with an inlet opening and an outlet opening, and said walls of said box defining said second compartment being provided with an inlet opening and an outlet opening;

refrigeration assembly means for air-conditioning the interior of the transport container is disposed in said first compartment and includes an evaporator, an evaporator fan, a condenser, a condenser fan and a refrigerant compressor, said refrigeration assembly means developing a condenser air flow through said condenser, which is drawn from said inlet opening of said first compartment and discharged from said outlet opening of said first compartment;

a common mount is disposed in said second compartment;

generator assembly means is located on said common mount and includes an internal combustion engine, an engine radiator, a radiator fan and a generator, said generator assembly means developing a generator air flow there through, which is drawn from said inlet opening of said second compartment and discharged from said outlet opening of said second compartment;

said engine, said engine radiator, said radiator fan and said generator being linearly arranged on said common mount;

a fork insertion pocket member is installed in said partition and is located on the downstream side of side engine radiator and defines through holes so as to discharge forward a portion of warmed air flowing through said engine radiator;

said condenser air flow developed by said refrigeration assembly means and said generator air flow developed by said generator assembly means having independent paths through respective said first and second compartments of sai box, and said generator assembly means being capable of being installed into and removed from said box as one unit.

19. A refrigeration apparatus for a transport container, comprising:

a box having walls which is mountable on a front wall of the transport container;

a partition located in said box divides said box into first and second compartments, said walls of said box defining said first compartment being provided with an inlet opening and an outlet opening, and said walls of said box defining said second compartment being provided with an inlet opening and an outlet opening;

refrigeration assembly means for air-conditioning the interior of the transport container is disposed in said first compartment and includes an evaporator, an evaporator fan, a condenser, a condenser fan and a refrigerant compressor, said refrigeration assembly means developing a condenser air flow through said condenser, which is drawn from said inlet opening of said first compartment and discharged from said outlet opening of said first compartment;

a common mount is disposed in said second compartment;

generator assembly means is located on said common mount and includes an internal combustion engine, an engine radiator, a radiator fan and a generator, said generator assembly means developing a generator air flow there through, which is drawn from said inlet opening of said second compartment and discharged from said outlet opening of said second compartment;

a detachable panel is provided with first and second air inlet openings and is located in the front of said box, said first air inlet opening is connected to an air inlet of said generator through a duct, and said second air inlet opening is connected to an air inlet of an air cleaner through ducts;

said engine, said engine radiator, said radiator fan and said generator being linearly arranged on said common mount;

said condenser air flow developed by said refrigeration assembly means and said generator air flow developed by said generator assembly means having independent paths through respective said first and second compartments of said box, and said generator assembly means being capable of being installed into and removed from said box as one unit.

20. A refrigeration apparatus for a transport container, comprising:

a box having walls which is mountable on a front wall of the transport container;

a partition located in said box divides said box into first and second compartments, said walls of said box defining said first compartment being provided with an inlet opening and an outlet opening, and said walls of said box defining said second compartment being provided with an inlet opening and an outlet opening;

refrigeration assembly means for air-conditioning the interior of the transport container is disposed in said first compartment and includes an evaporator, an evaporator fan, a condenser, a condenser fan and a refrigerant compressor, said refrigeration assembly means developing a condensor air flow through the condenser, which is drawn from said inlet opening of said first compartment and discharged from said outlet opening of said first compartment;

a common mount is disposed in said second compartment, said common mount being provided with a plurality of through holes for fitting bolts on one side thereof as well as recesses on the rear face of the other side thereof, and a bottom plate of said box being provided with a plurality of through holes for fitting the bolts on one side of the bottom plate as well as a plurality of guide means which are respectively engaged with said recesses on the other side of said common mount;

generator assembly means is provided on said common mount and includes an internal combustion engine, an engine radiator, a radiator fan and a generator, said generator assembly means developing a generator air flow there through, which is drawn from said inlet opening of said second compartment and discharged from said outlet opening of said second compartment;

said engine, said engine radiator, said radiator fan and said generator being linearly arranged on said common mount;

said condenser air flow developed by said refrigeration assembly means and said generator air flow developed by said generator assembly means having independent paths through respective said first and second compartments of said box, and said generator assembly means being capable of being installed into and removed from said box as one unit.

21. A refrigeration apparatus as claimed in claim 20, wherein one of said guide means includes a male screw fixed on said bottom plate, a freely rotating guide roller for guiding one of said recesses of common mount and enclosing a lower portion of said male screw, a lever including a female thread is engaged with an upper portion of said male screw, and a tightening hook fixed on said lever and engaged with said common mount, another one of said guide means includes a guide pin fixed to said bottom plate and a freely rotating guide roller enclosing the pin and guiding another one of said recesses of said common mount.

* * * * *